United States Patent
Warmington et al.

(10) Patent No.: US 10,346,912 B2
(45) Date of Patent: Jul. 9, 2019

(54) SYSTEM AND METHOD FOR FINANCIAL MATCHING

(71) Applicant: Tradeweb Markets LLC, New York, NY (US)

(72) Inventors: Rupert Warmington, West Sussex (GB); Ian Stocks, Livingston, NJ (US); James W. Dale, London (GB)

(73) Assignee: Tradeweb Markets LLC, New York, NY (US)

( * ) Notice: Subject to any disclaimer, the term of this patent is extended or adjusted under 35 U.S.C. 154(b) by 0 days.

(21) Appl. No.: 15/006,331

(22) Filed: Jan. 26, 2016

(65) Prior Publication Data

US 2016/0140660 A1    May 19, 2016

Related U.S. Application Data

(63) Continuation of application No. 14/215,992, filed on Mar. 17, 2014, now abandoned.

(60) Provisional application No. 61/791,209, filed on Mar. 15, 2013.

(51) Int. Cl.
    *G06Q 40/00* (2012.01)
    *G06Q 40/04* (2012.01)
    *G06F 16/24* (2019.01)

(52) U.S. Cl.
    CPC ............. *G06Q 40/04* (2013.01); *G06F 16/24* (2019.01)

(58) Field of Classification Search
    CPC ......... G06Q 40/00; G06Q 40/04; G06Q 40/06
    USPC ............................................ 705/35, 36 R, 37
    See application file for complete search history.

(56) References Cited

U.S. PATENT DOCUMENTS

| | | |
|---|---|---|
| 3,865,380 A | 2/1975 | Thomas |
| 4,674,044 A | 6/1987 | Kalmus et al. |
| 4,750,135 A | 6/1988 | Boilen |
| 5,003,473 A | 3/1991 | Richards |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,195,031 A | 3/1993 | Ordish |
| 5,270,922 A | 12/1993 | Higgins |
| 5,297,032 A | 3/1994 | Trojan et al. |

(Continued)

FOREIGN PATENT DOCUMENTS

WO    2007041220 A2    4/2007

OTHER PUBLICATIONS

ATS Morphs Limitrader into a Technology SellerSchmerken, Ivy. Wall Street & Technology 19.5: 36. United Business Media LLC. (May 2001) (Year: 2001).*

(Continued)

*Primary Examiner* — Lalita M Hamilton
(74) *Attorney, Agent, or Firm* — Stroock & Stroock & Lavan LLP

(57) ABSTRACT

A trading platform for trading financial instruments, and in particular for clearing odd lots, that provides the ability to receive, manage, match, and supervise orders. In an exemplary embodiment, the trading platform includes computer software modules and provides graphical user interfaces to handle the process of entering orders for desired positions, monitor the status of open positions, and obtain data in connection order requests. The trading platform is also capable of matching orders and sending orders to be executed.

14 Claims, 15 Drawing Sheets

(56) References Cited

U.S. PATENT DOCUMENTS

| | | | |
|---|---|---|---|
| 5,497,317 A | 3/1996 | Hawkins et al. |
| 5,502,637 A | 3/1996 | Beaulieu et al. |
| 5,727,165 A | 6/1998 | Ordish et al. |
| 5,774,880 A | 6/1998 | Ginsberg |
| 5,826,243 A | 10/1998 | Musmanno et al. |
| 5,857,176 A | 1/1999 | Ginsberg |
| 5,905,974 A | 5/1999 | Fraser et al. |
| 5,924,082 A | 7/1999 | Silverman et al. |
| 5,924,083 A | 7/1999 | Silverman et al. |
| 5,927,031 A | 7/1999 | Martin |
| 5,940,809 A | 8/1999 | Musmanno et al. |
| 5,946,667 A | 8/1999 | Tull, Jr. et al. |
| 5,987,432 A | 11/1999 | Zusman et al. |
| 6,006,206 A | 12/1999 | Smith et al. |
| 6,016,482 A | 1/2000 | Molinari et al. |
| 6,029,146 A | 2/2000 | Hawkins et al. |
| 6,092,056 A | 7/2000 | Tull, Jr. et al. |
| 6,105,005 A | 8/2000 | Fuhrer |
| 6,161,099 A | 12/2000 | Harrington et al. |
| 6,173,270 B1 | 1/2001 | Cristofich et al. |
| 6,260,025 B1 | 7/2001 | Silverman et al. |
| 6,269,346 B1 | 7/2001 | Cristofich et al. |
| 6,317,727 B1 | 11/2001 | May |
| 6,317,751 B1 | 11/2001 | Yeger et al. |
| 6,347,307 B1 | 2/2002 | Sandhu |
| 6,393,409 B2 | 5/2002 | Young et al. |
| 6,421,653 B1 | 7/2002 | May |
| 6,462,758 B1 | 10/2002 | Price et al. |
| 6,505,175 B1 | 1/2003 | Silverman et al. |
| 6,519,574 B1 | 2/2003 | Wilton et al. |
| 6,560,580 B1 | 5/2003 | Fraser et al. |
| 6,587,840 B1 | 7/2003 | Smith et al. |
| 6,606,637 B1 | 8/2003 | Hill et al. |
| 6,993,511 B2 | 1/2006 | Himmelstein |
| 7,356,500 B1 | 4/2008 | Waelbroeck et al. |
| 7,499,883 B2 | 3/2009 | Goldenberg et al. |
| 7,523,063 B2 | 4/2009 | Harrington et al. |
| 7,526,443 B2 | 4/2009 | Agarwal et al. |
| 7,539,641 B2 | 5/2009 | Agarwal et al. |
| 7,555,455 B2 | 6/2009 | Agarwal et al. |
| 7,590,585 B2 | 9/2009 | Agarwal et al. |
| 7,822,677 B1 | 10/2010 | Rodrigues et al. |
| 7,860,796 B2 | 12/2010 | Levy |
| 8,165,955 B2 | 4/2012 | Agarwal et al. |
| 8,185,465 B2 | 5/2012 | Schiffman et al. |
| 8,195,558 B2 | 6/2012 | Goldenberg et al. |
| 8,296,221 B1 | 10/2012 | Waelbroeck et al. |
| 8,392,314 B1 | 3/2013 | Epstein et al. |
| 8,527,396 B2 | 9/2013 | Agarwal et al. |
| 8,682,777 B1 | 3/2014 | Epstein et al. |
| 2001/0051908 A1 | 12/2001 | Foster et al. |
| 2002/0002530 A1 | 1/2002 | May |
| 2002/0004777 A1 | 1/2002 | Foster et al. |
| 2002/0016761 A1 | 2/2002 | Foster et al. |
| 2002/0023043 A1 | 2/2002 | Samukawa et al. |
| 2002/0026400 A1 | 2/2002 | Naravan et al. |
| 2002/0046149 A1 | 4/2002 | Otero et al. |
| 2002/0046151 A1 | 4/2002 | Otero et al. |
| 2002/0046156 A1 | 4/2002 | Horn et al. |
| 2002/0049661 A1 | 4/2002 | Otrero et al. |
| 2002/0052824 A1 | 5/2002 | Mahanti et al. |
| 2002/0055901 A1 | 5/2002 | Gianakouros et al. |
| 2002/0082967 A1 | 6/2002 | Kaminsky et al. |
| 2002/0091621 A1 | 7/2002 | Conklin et al. |
| 2002/0099645 A1 | 7/2002 | Agarwal et al. |
| 2002/0099646 A1 | 7/2002 | Agarwal et al. |
| 2002/0099651 A1 | 7/2002 | May |
| 2002/0116317 A1 | 8/2002 | May |
| 2002/0128945 A1 | 9/2002 | Moss et al. |
| 2002/0128955 A1 | 9/2002 | Brady et al. |
| 2002/0133454 A1 | 9/2002 | Malitzis et al. |
| 2002/0143694 A1 | 10/2002 | Young et al. |
| 2002/0156719 A1 | 10/2002 | Finebaum et al. |
| 2002/0169704 A1 | 11/2002 | Gilbert et al. |
| 2002/0184142 A1 | 12/2002 | Whang |
| 2003/0009421 A1 | 1/2003 | Bansal et al. |
| 2003/0033212 A1 | 2/2003 | Sandhu et al. |
| 2003/0046095 A1 | 3/2003 | Jessop et al. |
| 2003/0046219 A1 | 3/2003 | Rosedale et al. |
| 2003/0055774 A1 | 3/2003 | Ginsberg |
| 2003/0061069 A1 | 3/2003 | Silverman et al. |
| 2003/0088509 A1 | 5/2003 | Wilton et al. |
| 2003/0093359 A1 | 5/2003 | Martyn et al. |
| 2003/0093360 A1 | 5/2003 | May |
| 2003/0115131 A1 | 6/2003 | Heaton et al. |
| 2003/0139997 A1 | 7/2003 | Ginsburg |
| 2003/0149646 A1 | 8/2003 | Chen et al. |
| 2003/0158809 A1 | 8/2003 | Carney et al. |
| 2004/0024681 A1 | 2/2004 | Moore et al. |
| 2004/0034591 A1 | 2/2004 | Waelbroeck et al. |
| 2004/0209596 A1 | 2/2004 | Wong et al. |
| 2004/0059666 A1 | 3/2004 | Waelbroeck et al. |
| 2004/0064420 A1 | 4/2004 | Buist |
| 2004/0138957 A1 | 7/2004 | Bartolini et al. |
| 2004/0143540 A1 | 7/2004 | Song |
| 2004/0172356 A1 | 9/2004 | Agarwal et al. |
| 2004/0236668 A1 | 11/2004 | Toffey |
| 2005/0021445 A1 | 1/2005 | Caro |
| 2005/0097029 A1 | 5/2005 | Cooper |
| 2005/0131797 A1 | 6/2005 | Ananthanarayanan et al. |
| 2005/0171895 A1 | 8/2005 | Howorka et al. |
| 2006/0161494 A1 | 7/2006 | Littlewood |
| 2006/0253382 A1 | 11/2006 | Adcock et al. |
| 2007/0073608 A1 | 3/2007 | Garcia |
| 2008/0120220 A1 | 5/2008 | Pein |
| 2008/0270290 A1 | 10/2008 | Harrington et al. |
| 2008/0294544 A1 | 11/2008 | Harrington et al. |
| 2008/0306864 A1 | 12/2008 | Foley et al. |
| 2009/0055305 A1 | 2/2009 | Hirani et al. |
| 2010/0121759 A1 | 5/2010 | Waelbroeck et al. |
| 2011/0178915 A1 | 7/2011 | Vinokour et al. |
| 2014/0149273 A1 | 5/2014 | Angell et al. |

OTHER PUBLICATIONS

International Search Report dated Aug. 27, 2014 in International Application No. PCT/US2014/030369.

International Search Report and Written Opinion of the International Searching Authority (US) for International Application No. PCT/US08/66162 dated Aug. 8, 2008.

International Search Report dated Jun. 19, 2006 in International Application No. PCT/US2005/10226.

"Indii.communications Home Page", [online]. [archived on Jun. 4, 2001] Retrieved from the Internet: <URL: http://web.archive.org/web/20010604120607/http://www.indii.com/index.html>, 13 pgs.

"Indii.Communications Home Page", [online]. [archived on May 29, 2002] Retrieved from the Internet: <URL: http://web.archive.org/web/20020529135230/http://www.indii.com/>, 13 pgs.

"Indii.Communications Home Page", [online]. [archived on Sep. 7, 2003] Retrieved from the Internet: <URL: http://web.archive.org/web/20030907070442/http://www.indii.com/index.html>, 11 pgs.

"Indii.Communications Home Page", [online]. [retrieved on Apr. 2, 2004] Retrieved from the Internet: <URL: http://web.archive.org/web/20040402015803/http://www.indii.com/index.html>, 13 pgs.

"Indii.Communications Home Page", [online]. [archived on Apr. 28, 2004] Retrieved from the Internet: <URL: http://web.archive.org/web/20040428200642/http://www.indii.com/>, 13 pgs.

"Indii.Communications Home Page", [online]. [archived on Sep. 18, 2004] Retrieved from the Internet: <URL: http://web.archive.org/web/20040918033105/http://www.indii.com/>, 16 pgs.

"Indii.Communications Home Page", [online]. [archived on Oct. 16, 2004]. Retrieved from the Internet: <URL: http://web.archive.org/web/20041 016134223/http://www.indii.com/index.html>. 16 pgs.

"Indii.Communications Home Page", [online]. [archived on Oct. 31, 2005] Retrieved from the Internet: <URL: http://www.indii.com>, 21 pgs.

Atwell, S., et al., "Financial Information Exchange Protocol (FIX)", FIXML 4.4 Schema Version Guide, Version 4.4 Schema, (Jan. 9, 2004 ), 1-51.

(56) References Cited

OTHER PUBLICATIONS

"NYFIX®—NYFIX Natural", [online]. © 2006 NYFIX Inc. [archived Jul. 21, 2006]. Retrieved from the Internet: <URL: http://web.archive.org/web/20060 721 050620/http :/ /www. nyfix. com/buys ide-solutions/transactionservices/nyfix-natural>, 1 pg.
Application Serial No. PCT/US06/37857, International Search Report dated Nov. 29, 2007 , 7 pgs.
Application Serial No. PCT/US06/37857, Written Opinion dated Nov. 29, 2007, 11 pgs.
U.S. Appl. No. 11/239,663, Non-Final Office Action dated Mar. 18, 2008, 21 pgs.
U.S. Appl. No. 11/239,663, Non-Final Office Action dated Dec. 24, 2008, 14 pgs.
Anonymous"SolutionForge launches 'FIX. NET Trader' to make order management more accessible to sell-side; Full featured, FIX-compliant Order Management System brings advantagesof automated order management to small medium-sized sellside firmsFIX. NETTrader addresses calls from buy-side for the sell-side to embrace FIX-enabled trading" Jun. 18, 2003,M2PRE.
U.S. Appl. No. 11/239,663, Final Office Action dated Sep. 4, 2009, 25 pgs.
Mills, Michael "Compliance Clarified Selling IPOs Over the 'NET. (Brief Article)" Jul. 5, 1999, Compliance Reporter, 6, 14, 10.
Extended European Search Report dated Apr. 4, 2019 in European Patent Application No. 18209256.9.

\* cited by examiner

| ISIN | Dealer Specific Ranking (Short positions) | | |
|---|---|---|---|
| | Position | Position Rank | Percentile_Rank |
| ISIN 1 | 5,000 | 1 | 001_001 |
| ISIN 2 | 10,000 | 2 | 001_002 |
| ISIN 3 | 15,000 | 3 | 001_003 |
| ISIN 4 | 20,000 | 4 | 001_004 |
| ISIN 5 | 25,000 | 5 | 002_005 |
| ISIN 6 | 30,000 | 6 | 002_006 |
| ISIN 7 | 35,000 | 7 | 002_007 |
| ISIN 8 | 40,000 | 8 | 002_008 |
| ISIN 9 | 45,000 | 9 | 003_009 |
| ISIN 10 | 50,000 | 10 | 003_010 |
| ISIN 11 | 55,000 | 11 | 003_011 |
| ISIN 12 | 60,000 | 12 | 003_012 |
| ISIN 13 | 65,000 | 13 | 004_013 |
| ... | ... | ... | ... |
| ISIN 399 | 900,000 | 399 | 100_399 |
| ISIN 400 | 1,000,000 | 400 | 100_400 |

FIG. 3

| Short Ranking | | | | | | Long Ranking | | | | | |
|---|---|---|---|---|---|---|---|---|---|---|---|
| Dlr | Dlr Rank | ISIN | Percentile_Rank | Position | Final Position | Dlr | Dlr Rank | ISIN | Percentile_Rank | Position | Final Position |
| Dlr 1 | 7 | ISIN 1 | 001_003 | 90,700 | - | Dlr 4 | 4 | ISIN 24 | 001_001 | 50,000 | 50,000 |
| Dlr 2 | 5 | ISIN 2 | 001_001 | 92,100 | 92,100 | Dlr 2 | 2 | ISIN 25 | 001_001 | 92,300 | 92,300 |
| Dlr 3 | 7 | ISIN 3 | 001_001 | 94,900 | 94,900 | Dlr 7 | 7 | ISIN 1 | 001_001 | 2,300 | 2,300 |
| Dlr 4 | 5 | ISIN 4 | 001_001 | 95,600 | 95,600 | Dlr 2 | 2 | ISIN 27 | 001_001 | 93,200 | 93,200 |
| Dlr 5 | 5 | ISIN 5 | 001_001 | 96,500 | 96,500 | Dlr 7 | 7 | ISIN 28 | 001_001 | 95,000 | 95,000 |
| Dlr 6 | 8 | ISIN 6 | 001_001 | 98,000 | 98,000 | Dlr 8 | 8 | ISIN 29 | 001_001 | 97,400 | 97,400 |
| Dlr 7 | 7 | ISIN 7 | 001_001 | 98,800 | 98,800 | Dlr 5 | 5 | ISIN 30 | 001_001 | 98,700 | 98,700 |
| Dlr 8 | 2 | ISIN 8 | 001_001 | 99,800 | 99,800 | Dlr 5 | 5 | ISIN 31 | 001_001 | 99,900 | 99,900 |
| Dlr 1 | 3 | ISIN 9 | 001_002 | 111,000 | 111,000 | Dlr 2 | 2 | ISIN 32 | 001_002 | 100,100 | 100,100 |
| Dlr 2 | 1 | ISIN 10 | 001_002 | 114,600 | - | Dlr 8 | 8 | ISIN 33 | 001_002 | 104,300 | 104,300 |
| Dlr 3 | 1 | ISIN 11 | 001_002 | 115,100 | 114,600 | Dlr 5 | 5 | ISIN 34 | 001_002 | 109,500 | 109,500 |
| Dlr 4 | 2 | ISIN 12 | 001_002 | 115,100 | 115,100 | Dlr 1 | 1 | ISIN 35 | 001_002 | 113,600 | 113,600 |
| Dlr 5 | 2 | ISIN 13 | 001_002 | 116,600 | 116,600 | Dlr 1 | 1 | ISIN 36 | 001_002 | 118,200 | 118,200 |
| Dlr 6 | 4 | ISIN 14 | 001_002 | 116,800 | 116,800 | Dlr 3 | 3 | ISIN 37 | 001_002 | 118,800 | 118,800 |
| Dlr 7 | 4 | ISIN 15 | 001_002 | 117,100 | 117,100 | Dlr 1 | 1 | ISIN 38 | 001_002 | 119,500 | 119,500 |
| Dlr 1 | 2 | ISIN 16 | 001_003 | 117,100 | 117,100 | Dlr 1 | 1 | ISIN 39 | 001_003 | 120,400 | 120,400 |
| Dlr 2 | 3 | ISIN 17 | 001_003 | 117,300 | 117,300 | Dlr 3 | 3 | ISIN 40 | 001_003 | 120,600 | 120,600 |
| Dlr 3 | 1 | ISIN 18 | 001_003 | 119,600 | 119,600 | Dlr 4 | 4 | ISIN 41 | 001_003 | 120,600 | 120,600 |
| Dlr 5 | 3 | ISIN 19 | 001_003 | 119,700 | 119,700 | Dlr 6 | 6 | ISIN 42 | 001_003 | 120,600 | 3,700 |
| Dlr 1 | 6 | ISIN 20 | 001_004 | 120,700 | 120,700 | Dlr 3 | 3 | ISIN 43 | 001_004 | 120,600 | 120,600 |
| Dlr 8 | 6 | ISIN 21 | 002_002 | 120,700 | 120,700 | Dlr 4 | 4 | ISIN 44 | 002_002 | 120,600 | 120,600 |
| Dlr 4 | 4 | ISIN 22 | 002_003 | 120,700 | 120,700 | Dlr 6 | 6 | ISIN 45 | 002_003 | 120,600 | 120,600 |
| Dlr 6 | 6 | ISIN 23 | 002_003 | 120,700 | 120,700 | Dlr 6 | 6 | ISIN 46 | 002_003 | 120,600 | 120,600 |

FIG. 4

| | All sectors | | | | Corporates | | | | Financials | | |
|---|---|---|---|---|---|---|---|---|---|---|---|
| | Total % netted | | Short % netted | Long % netted | Total % netted | | Short % netted | Long % netted | Total % netted | | Short % netted | Long % netted |
| EUR | 30% | | 35% | 27% | 30% | | 35% | 26% | 30% | | 34% | 27% |
| GBP | 25% | | 28% | 23% | 26% | | 30% | 24% | 25% | | 27% | 24% |
| Grand Total | 29% | | 33% | 26% | 29% | | 34% | 25% | 29% | | 32% | 27% |

FIG. 7

| Dealer | Position | Crossed Position |
|---|---|---|
| D1 | Short 50 | Closed |
| D2 | Long 100 | = 100 - (50/(100+150))*100 = 80 → D2 Long 80 |
| D3 | Long 150 | = 150 - (50/(100+150))*150 = 120 → D3 Long 120 |

FIG. 10

SYSTEM AND METHOD FOR FINANCIAL MATCHING

CROSS-REFERENCE TO RELATED APPLICATION

This application is a continuation of U.S. patent application Ser. No. 14/215,992, filed on Mar. 17, 2014, which claims the benefit of U.S. Provisional Patent Application No. 61/791,209, entitled SYSTEM AND METHOD FOR ODD LOT CLEAR-UP, filed on Mar. 15, 2013, the contents of which are incorporated herein by reference.

BACKGROUND OF THE INVENTION

Field of the Invention

The embodiments of the present invention relate to systems and methods for trading financial instruments and, in particular, to systems and methods for clearing odd lots with respect to all types of financial instruments, especially in fixed income financial instruments, such as bond markets (e.g., cash credit markets, government bonds, covered bonds, etc.).

Description of Related Art

Increasingly punitive balance sheet constraints and funding costs potentially threaten dealers providing liquidity in the e-traded segment of the market—typically in more "on the run" issues and in smaller trade sizes. This is exacerbated by steady increase in smaller sized tickets from index tracking funds and fast growing ETF market leading to high number of small line items on dealer books. Thus, Dealers need to increase velocity of turnover of these positions in order to maintain profitability. Current Interdealer Broker (IDB) markets are not servicing this need satisfactorily.

Accordingly, there's a need for efficient computerized systems and methods of matching to clear "odd lot" or "scrap" bonds from balance sheets.

SUMMARY OF THE INVENTION

In accordance with various embodiments of the invention, and as shown herein, various computerized systems and methods are disclosed which generally matches individual dealers opposing positions in bonds with a view to reducing their balance sheet positions in "odd lot" bonds to increase balance sheet efficiency. Netting/crossing of dealer long/short positions could address a meaningful proportion of buyer/seller (B/S) positions.

In general, in an exemplary embodiment, a computerized electronic trading system and method is provided that permits a user (e.g., a dealer) using a user computer to electronically input their positions into the trading system before the pre-specified session time expires. Each participating dealer will input their positions via a computer (e.g., a dealer computer) so that the trading system will hold details of each individual dealer's positions indicating without limitation whether or not they want to buy or sell each security and the size of said orders. The trading system includes one or more computers at least one message server for communicating electronic messages to the dealer computers, and a database system including at least one storage device, the database system stores data related to the dealers and positions. The computerized electronic trading system may be programmed with matching systems, modules, and/or algorithms, including one or more sub-components to handle receipt of position data, identify matching positions, determine minimum trade sizes, analyze changes in participant's risk, determine limits, prioritize dealers, matches and/or positions with the goal of maximizing match volume (using various methodologies), and generate prices for trades.

The invention disclosed herein may preferably be integrated into various types of electronic trading platforms. Trading platforms are well known in the art, for example, as disclosed in U.S. Pat. No. 7,433,842, entitled METHOD AND SYSTEM FOR EFFECTING STRAIGHT-THROUGH-PROCESSING OF TRADES OF VARIOUS FINANCIAL INSTRUMENTS, issued Oct. 7, 2008 and filed Mar. 25, 2004 as U.S. patent application Ser. No. 10/808,820, the entirety of which is incorporated herein by reference.

The invention disclosed herein may also utilize matching systems, such as, for example, those disclosed in U.S. patent application Ser. No. 12/907,667, entitled METHOD AND SYSTEM FOR IDENTIFYING HIGH PROBABILITY TRADE MATCHES, filed Oct. 19, 2010, the entirety of which is incorporated herein by reference.

It should be noted that although the embodiments described may use multiple software modules for performing the various functions of the system, other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to C++, ASP, Java, C#, ASP.NET, or PHP or any combination of known or later developed programming languages that allow the functionality described.

It will also be understood that, although the various embodiments of the present invention described herein are being described in terms of web-based centralized server architecture, a thin client, fat-client, or peer-to-peer type arrangement could be substituted for the system architecture described herein and are within the scope of the present invention. Additionally, the programming described herein can be stored in a machine readable form on a computer readable medium, such as a CD-ROM or DVD, and distributed to users for installation on user computers. Alternatively, such programming can be downloaded via network. In either embodiment, communication with the system may be effected across known networks, such as the Internet.

BRIEF DESCRIPTION OF THE DRAWINGS

It will be appreciated by those skilled in the art that the figures are purely illustrative, and that the system may be implemented in any number of ways, by the actual designers, as long as the functionality as described herein, stays intact. Furthermore, with regard to one or more of the figures, diagrams, and/or charts shown herein, due to limitation in capturing the entire screenshot into one picture, such figures, diagrams, and/or charts depict exemplary embodiments of the described subject matter taken in portions of the screenshots that reference other portions.

In the drawing figures, which are merely illustrative, and wherein like reference characters denote similar elements throughout the several views:

FIG. 3 is a table of exemplary data reflecting various features of an exemplary embodiment of a trading system and/or method;

FIG. 4 is a table of exemplary data reflecting various features of an exemplary embodiment of a trading system and/or method;

FIG. 7 is a table of exemplary data reflecting various features of an exemplary embodiment of a trading system and/or method;

FIG. 10 is a table of exemplary data reflecting various features of an exemplary embodiment of a trading system and/or method.

DETAILED DESCRIPTION OF THE EXEMPLARY EMBODIMENTS

In an exemplary embodiment, the concept of an electronic session based matching process can be used to reduce odd lot financial instruments, such as odd lot bonds. A trading system 1 that may include various software modules for execution of various processes and that is connectable with dealer via the dealer's computers is preferably provided.

Figure 1:
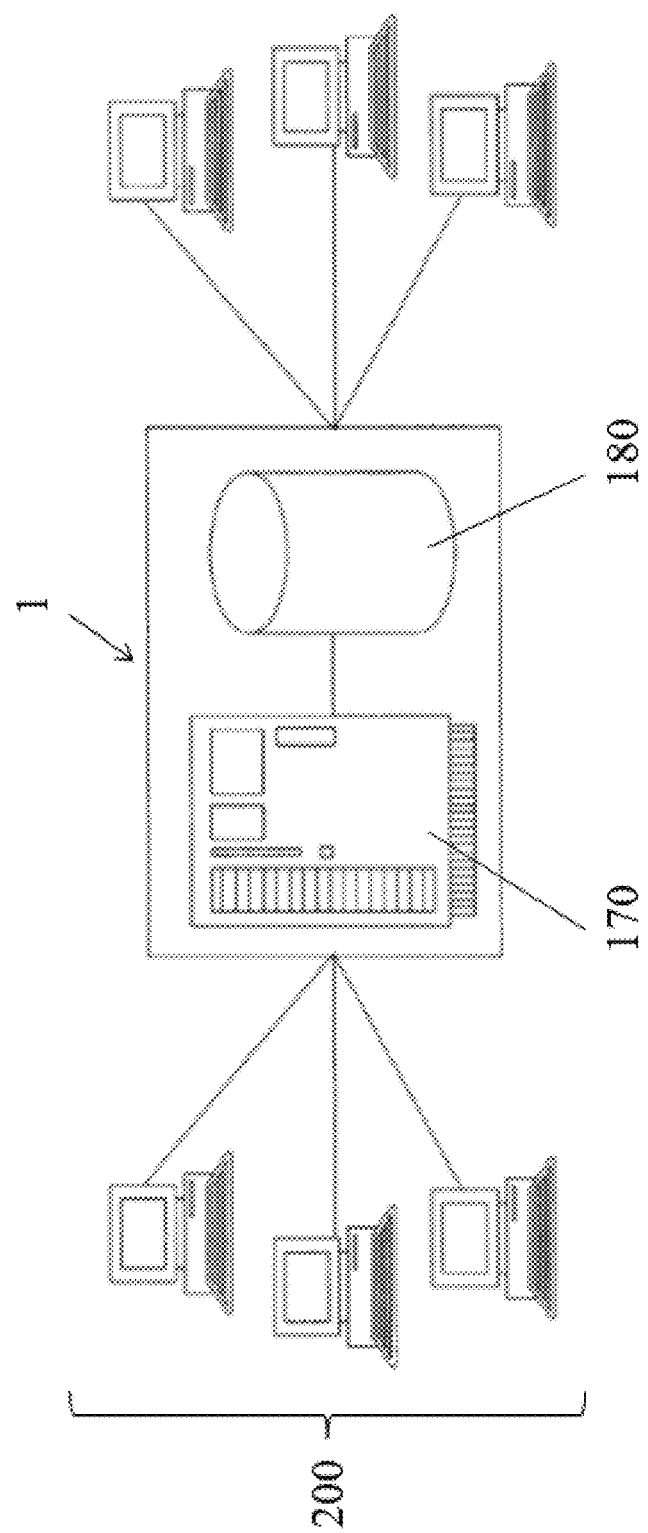
FIG. 1 is a diagram of an exemplary embodiment of a trading system in communication with various user computers.
Figure 2A:
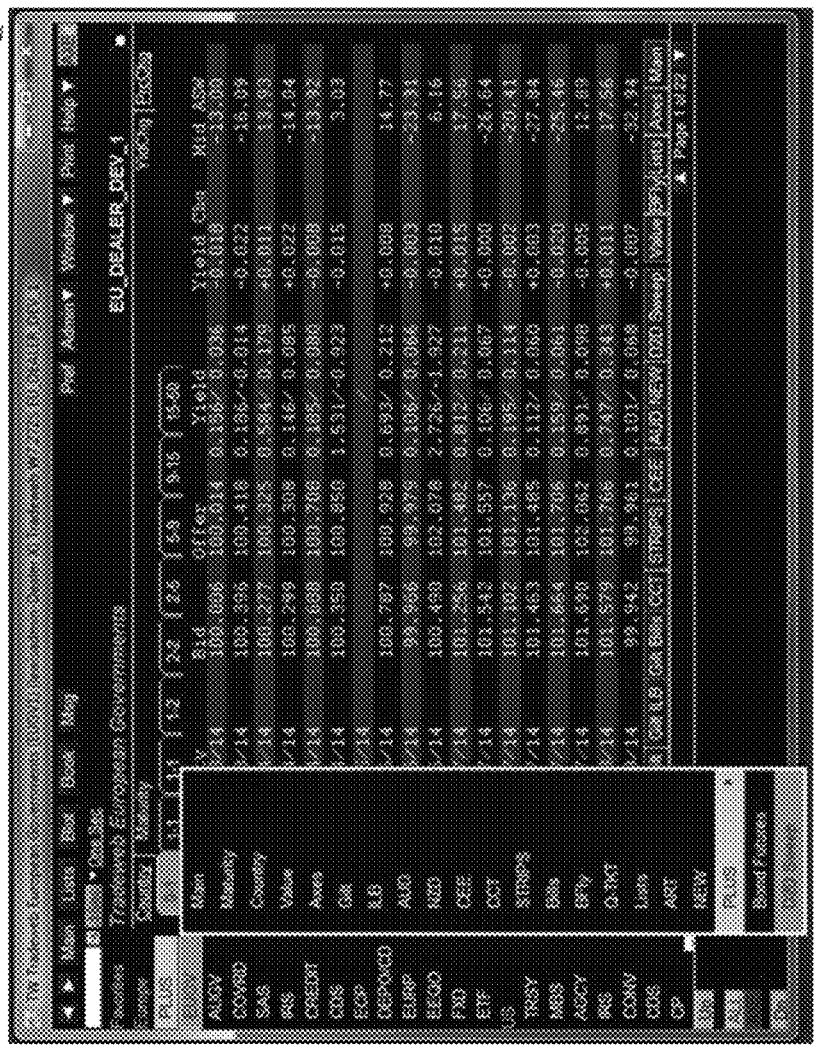
FIG. 2A is a screen shot depicting an exemplary graphical user interface of various features of an exemplary embodiment of a trading system.
Figure 2B:
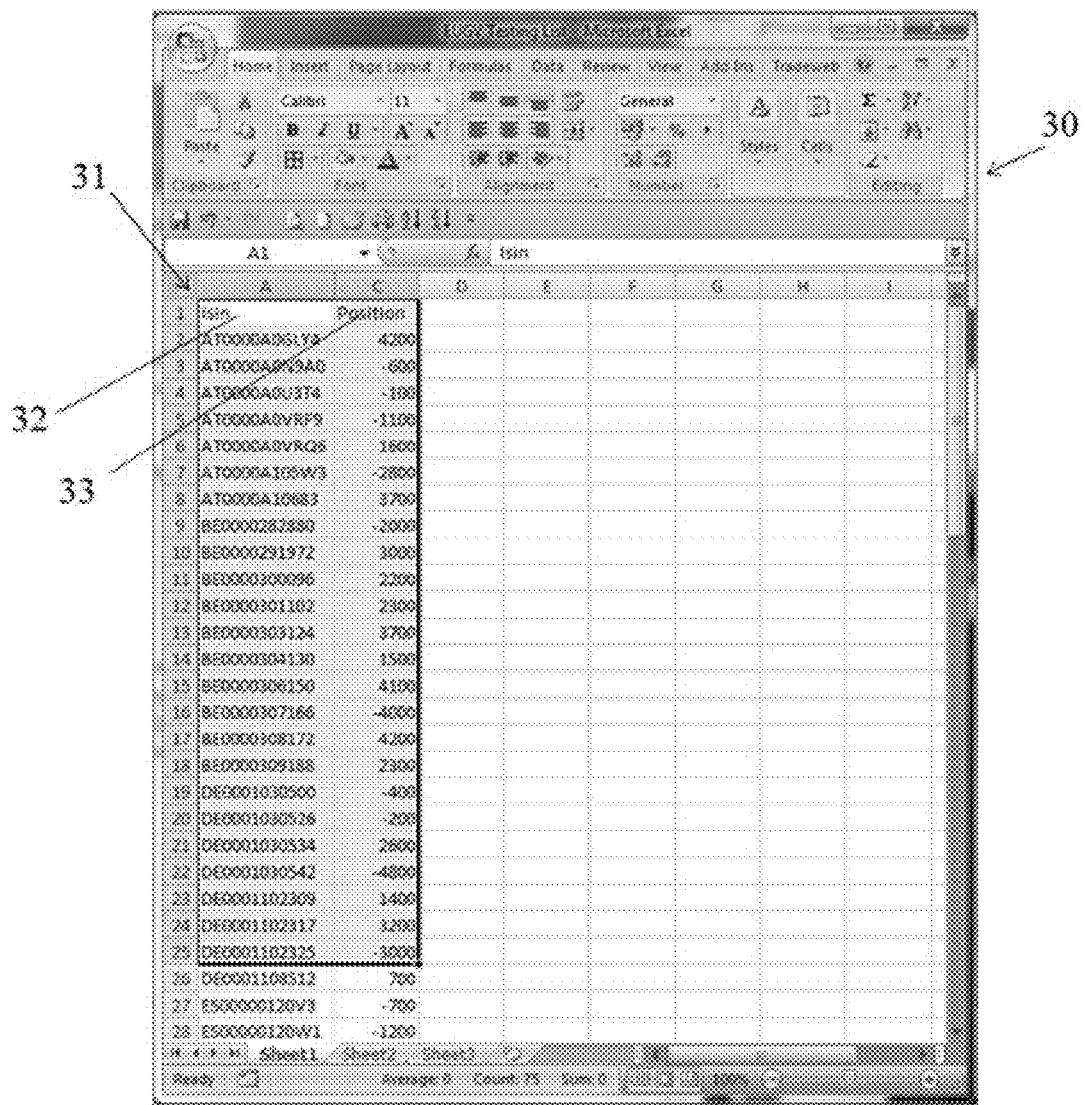
FIG. 2B is a screen shot depicting an exemplary spreadsheet of sample positions.

For example, FIG. 1 shows an exemplary embodiment of a trading system 1 in communication with various dealer computers 200. The trading system 1 preferable includes, or more computer systems 170, databases 180, and related database management systems. The trading system 1 also preferably provides the dealers a trading platform graphical user interface (GUI), such as GUI 10 (FIG. 2A).

Figure 2C:
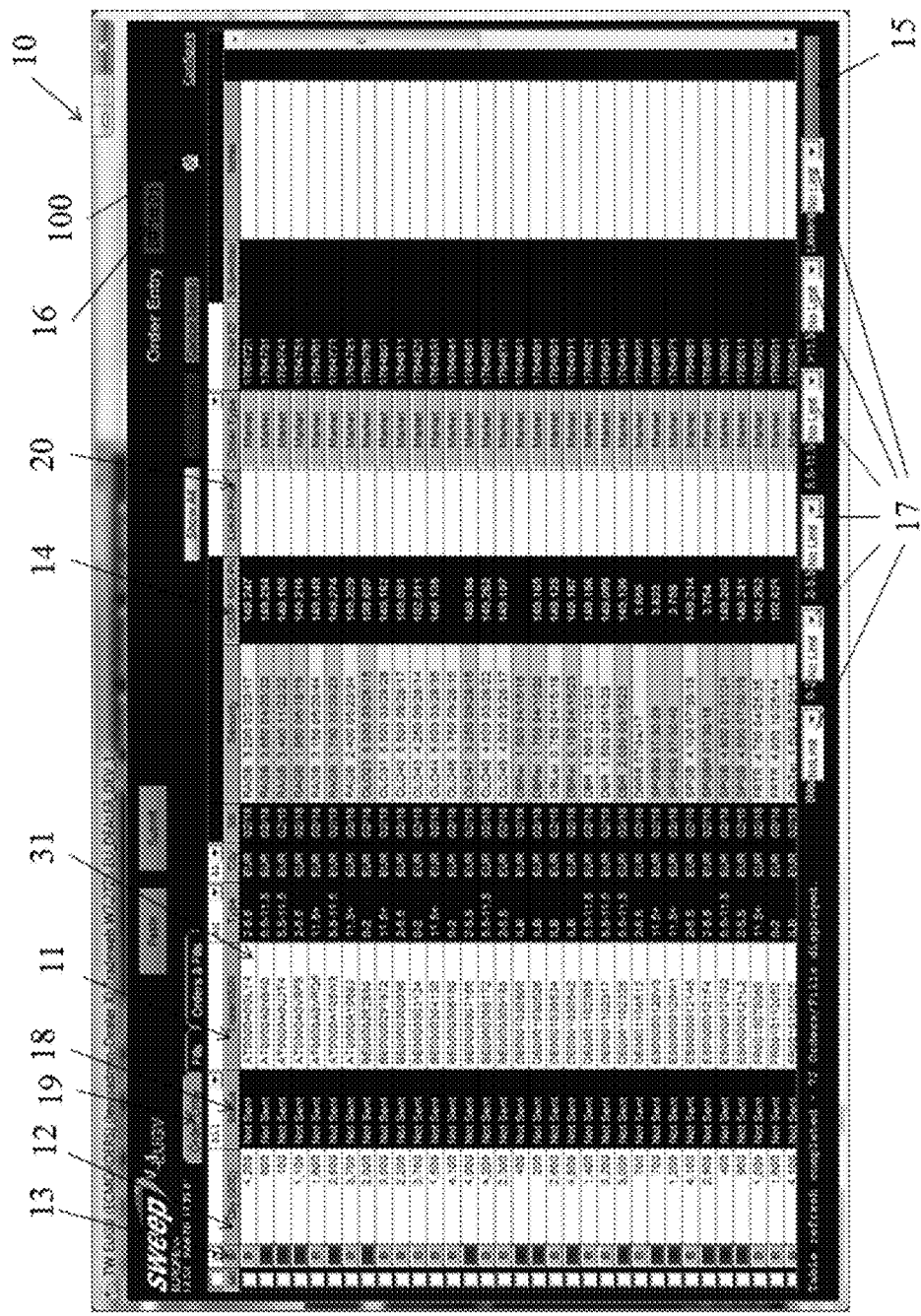
FIG. 2C is a screen shot depicting an exemplary graphical user interface of various features of an exemplary embodiment of a trading system.

With reference to FIGS. 2A-2F, in an exemplary embodiment, the GUI 10 includes an order entry screen 19 to allow dealers to enter orders (see, e.g., FIG. 2C). Dealers may contribute positions 31 via an upload or copy the positions from an excel spreadsheet 30 (or any other database/list) into the order entry screen 19. Such positions 31 may be dragged or inputted by the dealers into GUI 10 and are aggregated up to a point in time and, at a predetermined time, the system performs its matching process. The trading system 1 operates to seek matching positions in an anonymous manner, such that positions 31 will not be known to other dealers except when a position 31 matches a specific position of another dealer (e.g., opposes the position of the other dealer) and a trade is generated with one of their counterparts on system.

Positions 31 may include the ticker or International Securities Identification Number (ISIN) identification code 32 for a bond and a desired quantity 33. The order entry screen 19 may include a ticker or ISIN field 11 and a quantity field 12. The ticker or ISIN code 32 of a bond may be uploaded or copied into the ticker or ISIN field 11 of the order entry screen 19 and the designed quantity 33 may be uploaded or copied into the quantity field 12 of the order entry screen 19.

The order entry screen 19 may also include a Buy/Sell field 13 to indicate whether the user is seeking to buy or sell bonds. The GUI 10 may also include a price field 14. In an exemplary embodiment, the price is a mid price generated by the trading system 1, which is updated in substantially real-time based on a predetermined composite price (e.g., a D2C composite, or a trading system 1 composite price). The order entry screen 19 may also include a limit price field 20, which allows the user to specify price limits for a particular position 31.

In one embodiment, the mid price is determined by the trading system 1 based on the mid price of a predetermined composite. Preferably, the trading system 1 seeks out the mid price of the composite at the time a matching session begins.

In a preferred embodiment, GUI 10 includes a timer 16. The trading system 1 may be set to stop accepting orders at a predetermined time. The timer 16 preferable counts down to the 0:00 to indicate when the trading system 1 stops accepting orders (e.g., FIGS. 2E-2F). The trading system 1 may also be set to perform matching at a predetermined time. In another embodiment, the timer 16 may count down to the time at which the trading system 1 is set to perform matching. In some embodiments, multiple timers 16 may be provided, which keep track of the time remaining until various predetermined events are triggered.

GUI 10 preferably includes one or more risk limit fields 17, which provide the user the ability to set risk limits for various factors, e.g., interest rate risk limits for various maturity buckets. For example, inflation linked bonds, if the risk limit has been used to set at 10M, this means that after the trading system 1 runs its matching algorithm, the matches preferably do not change by more than the set limit amounts.

Figure 2D:
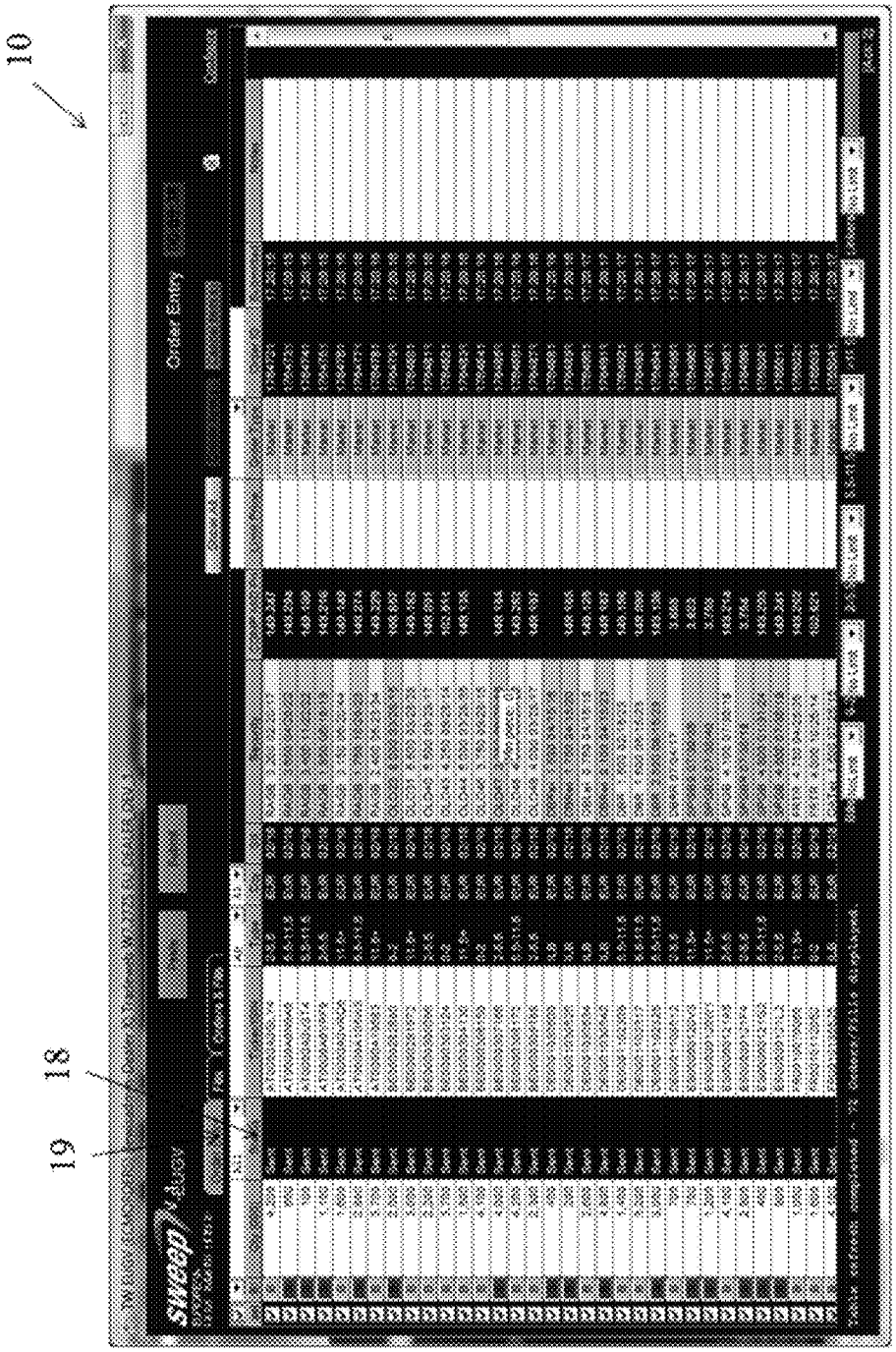
FIG. 2D is a screen shot depicting an exemplary graphical user interface of various features of an exemplary embodiment of a trading system.
Figure 2E:
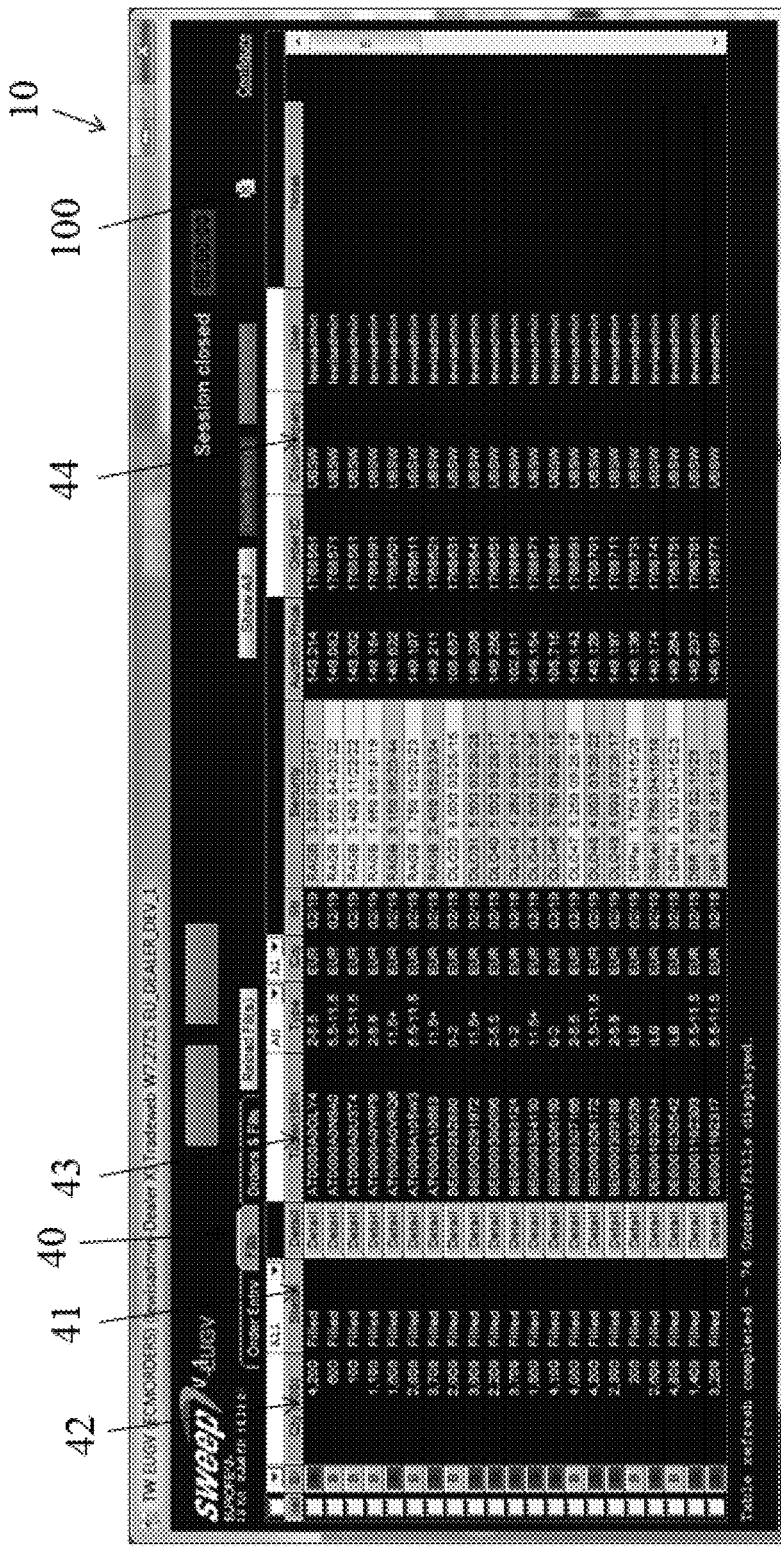
FIG. 2E is a screen shot depicting an exemplary graphical user interface of various features of an exemplary embodiment of a trading system.

Preferably, when the positions 31 are uploaded or copied into order entry screen 19, the order is not yet submitted. A user may submit an order for one or more positions 31 by clicking on the Submit button 15. The order entry screen 19 may include a status field 18, indicating the submitted status of an order. Prior to submission, the status field 18 preferably indicates that the order has not yet been sent (FIG. 2C). Once the order is submitted, the status field 18 preferably indicates that the order has been sent (FIG. 2D).

In an exemplary embodiment, any position 31 may be removed by the dealer while the timer 16 is counting down. A user can remove any position 31 that has been submitted before the timer 16 hits 0:00 by selecting the position 31 to be removed and clicking on the cancel button 21. When a position 31 is removed, preferably the status field 18 indicates that the removed position 31 has been cancelled.

In an exemplary embodiment, once the trading system 1 is ready for matching, the trading system 1, employing matching systems, modules, algorithms, and/or sub-components, determines whether there is a match by comparing positions 31 with positions of other dealers and determining whether any positions opposing a position 31 are present.

Preferably, a match is made when a position opposing position 31 is present. However, the trading system 1 may be configured to determine matches based on a variety of predetermined factors, without limitation.

In an exemplary embodiment, the trading system 1 engages in matching when the timer 16 hits 0:00 or in or around the time the timer hits 0.

In one exemplary embodiment of a matching algorithm implemented on the trading system 1, the trading system 1 searches for possible matches on an ISIN by ISIN basis with positions 31 ranked by: (1) dealer percentile; (2) dealer absolute rank; (3) dealer crossable volume; and (4) the entry time of the order. In one embodiment, the dealer percentile is determined by ranking of orders based on total liquidity for a dealer in said ISIN with ISIN with smallest liquidity assigned highest priority. The dealer absolute rank is determined by possible crossable volume for said dealer. The dealer crossable volume is determined by the number of possible matches a dealer has to offer as compared to other orders in the trading system 1. The entry time of the order is the time at which a dealer submits positions 31. The trading system 1 also preferably prioritizes (1) market orders over limit price orders; (2) wide limits over narrow limits (i.e., lower limits are preferred for sell orders and higher prices are preferred for buy orders); and disincentivizes shorter lists of position entries. Any positions 31 with a price limit outside the trading system's 1 mid price are preferably excluded from the matching process. Furthermore, trading system 1 may split positions 31 into shorts and longs and organize positions 31 into percentiles, the smallest being in the first percentile. Preferably, orders with price limits are processed last.

In an exemplary embodiment, the trading system 1 is preferably capable of maximizing the reduction and/or closure of large positions by performing a position ordering analysis. In one embodiment positions may be ranked for each dealer in percentiles based on size (long/short separately). Any orders with limits (price, risk, and/or otherwise) can be moved to the bottom of the list following the same criteria. Dealers may be ranked on relative basis based on maximum "Crossable Volume. All positions may be aggregated and ranked on first "Percentile Rank" and then on "Dealer Rank." The dealer with the highest potential crossable volume may be allowed to go first.

For example in an exemplary embodiment, the dealers may have the rankings shown in FIG. 3. In this example, an exemplary embodiment of an algorithm implemented on trading system 1 is preferably capable of performing the following functions:

Match the 1$^{st}$ Short ISIN with the highest priority for the 1$^{st}$ dealer against the dealer with contra position with the highest priority. If two dealers share same priority on a position, the volume would be split in equal proportions amongst them;

Loop until no further volume can be matched for this Short Position. Stop at the last marker order;

Go to the next case until reaching the last Short position (including limit orders);

For example, in the listing shown in FIG. 4, Dealer 1 has a cancelled out final position when matched with Dealer 7 which is left with a 2,300 final position. Similarly, Dealer 2 would result in a cancelled out final position when matched with Dealer 6.

In an exemplary embodiment, dealer positions 31 are aggregated immediately prior to the matching session, with liquidity focused at a point in time and matches created based on this liquidity. Various software algorithms and modules may be provided in furtherance of this functionality, which are capable of, by way of non-limiting example:

Maximizing potential crossed volume;

Maximizing individual closed dealer positions (e.g., by prioritizing closure of smaller dealer positions;

Allocating potential matches in an equitable manner between dealers (in some embodiments, while achieving the above); and Preventing dealers been left with positions below minimum tradable size in a bond (where original position was above this level).

Once the trading system 1 determines potential matches, the trading system 1 assesses the potential matches to ensure that any risk limits placed by the dealer are not violated by a trade. In the event that a match breaks a risk limit, the trading system 1 will break the trade and look to generate another match in order to maximize the match volume.

In an exemplary embodiment, where a match occurs, the trade matches at the trading system's 1 mid price. Checks are applied to these generated trades to ensure that any risk limits set by dealers aren't broken by the net effect of trades generated (e.g., their interest rate risk hasn't changed beyond set parameters) or that during the running of the session the wider market hasn't seen volatility beyond any set parameters. At the end of the session these generated trades are sent to dealers and may be processed straight through into the dealers' accounts on both sides of the trade using risk and/or booking systems. Preferably, as long as no limits set by the user and/or system or rules established by the system or applicable to the guidelines are broken, the trades are generated using this mid price.

In an another embodiment, when trades are generated in a matching session, the trades will be matched with the trading system 1 acting as a broker on a matched principal basis such that the counterparties do not know which other dealer(s) their side of the trade is being matched against. Thus, the trading system 1 acts as a riskless principal. Where a counterparty has traded a single order of a certain size with the trading system 1 acting as the broker which has been matched against multiple counterparties on the other side taking up all or part of that size, the algorithm will collapse such trade so that the original order generates a single trade regardless of how many orders are generated on the other side to fill or partially fill that original order. This reduces operational complexity for users of the system and reduces settlement cost.

Once the session is closed/finished, the GUI 10 preferably provides the user with data about whether orders have been filled. For example, with reference to FIG. 2E, GUI 10 may include a fills screen 40, which preferably includes a status field 41 that indicates whether an order for a particular position 31 has been filled. The fills screen 40 may also include a quantity field 42 that indicates the quantity of the each bond that has been filled and a ticker/ISIN field 43 that identifies each bond. A counterparty field 44 may also be provided, which indicates the counterparty the user has traded with.

Figure 2F:
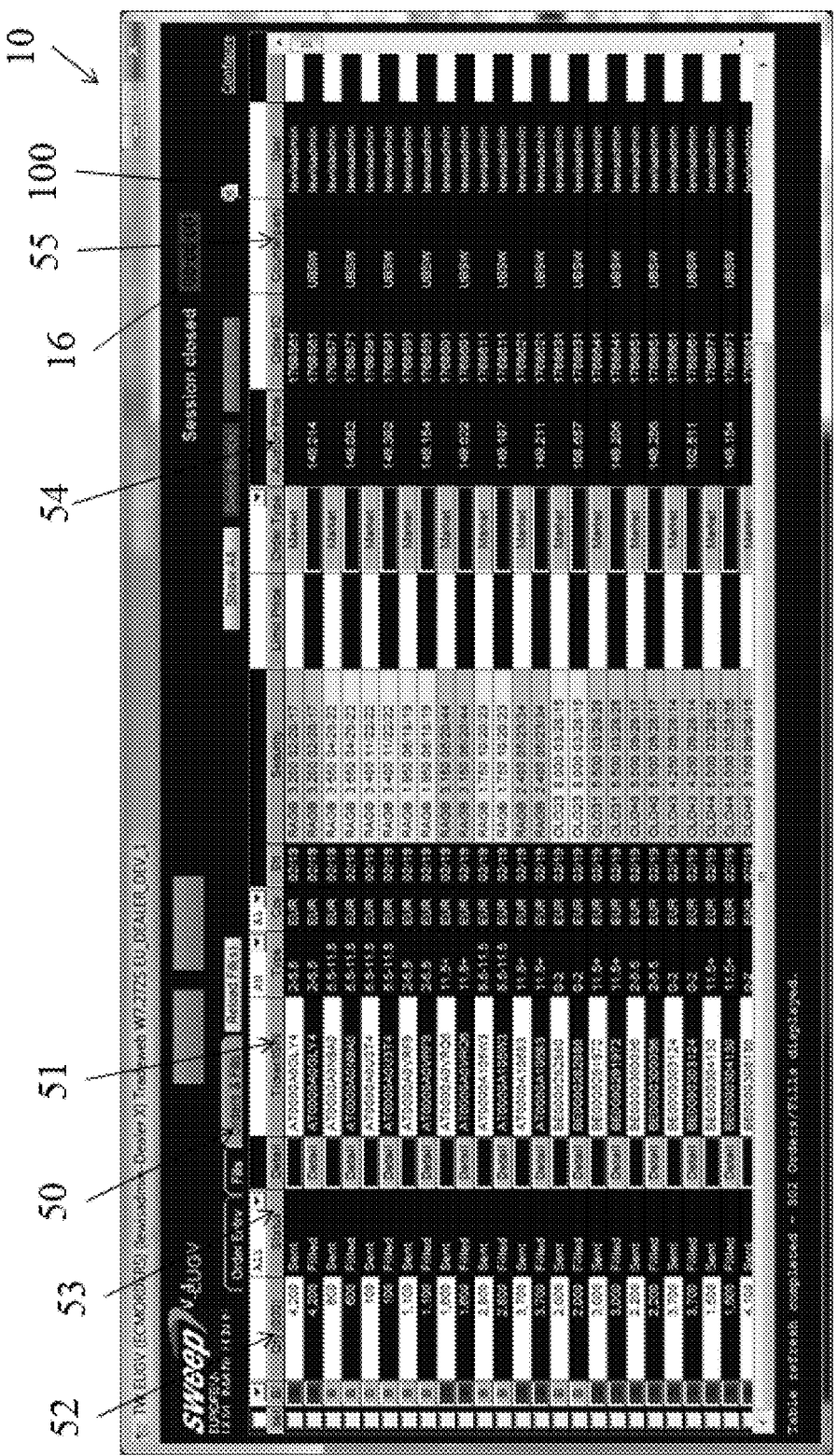
FIG. 2F is a screen shot depicting an exemplary graphical user interface of various features of an exemplary embodiment of a trading system.

With reference to FIG. 2F, in an exemplary embodiment, GUI 10 preferably includes an orders and fills screen 50. The orders and fills screen may include a ticker/ISIN field 51 that identifies each bond, a quantity field 52 that indicates the quantity of each bond acted upon, a status field 53 that indicates whether the order for a particular bond was filled, a price field 54 that indicates the price at which a bond has traded, and a counterparty field 55 that indicates the counterparty the user traded with.

In an exemplary embodiment, users can download data from any of the order entry screen 19, the fills screen 40, and/or the order and fills screen 50 to an excel spreadsheet (or any other type of database configured to work with the trading system 1) by clicking a button provided in the GUI 10. In one embodiment, the GUI 10 includes an excel button 100, which permits the user to download such an excel file with the desired data.

Figure 5:
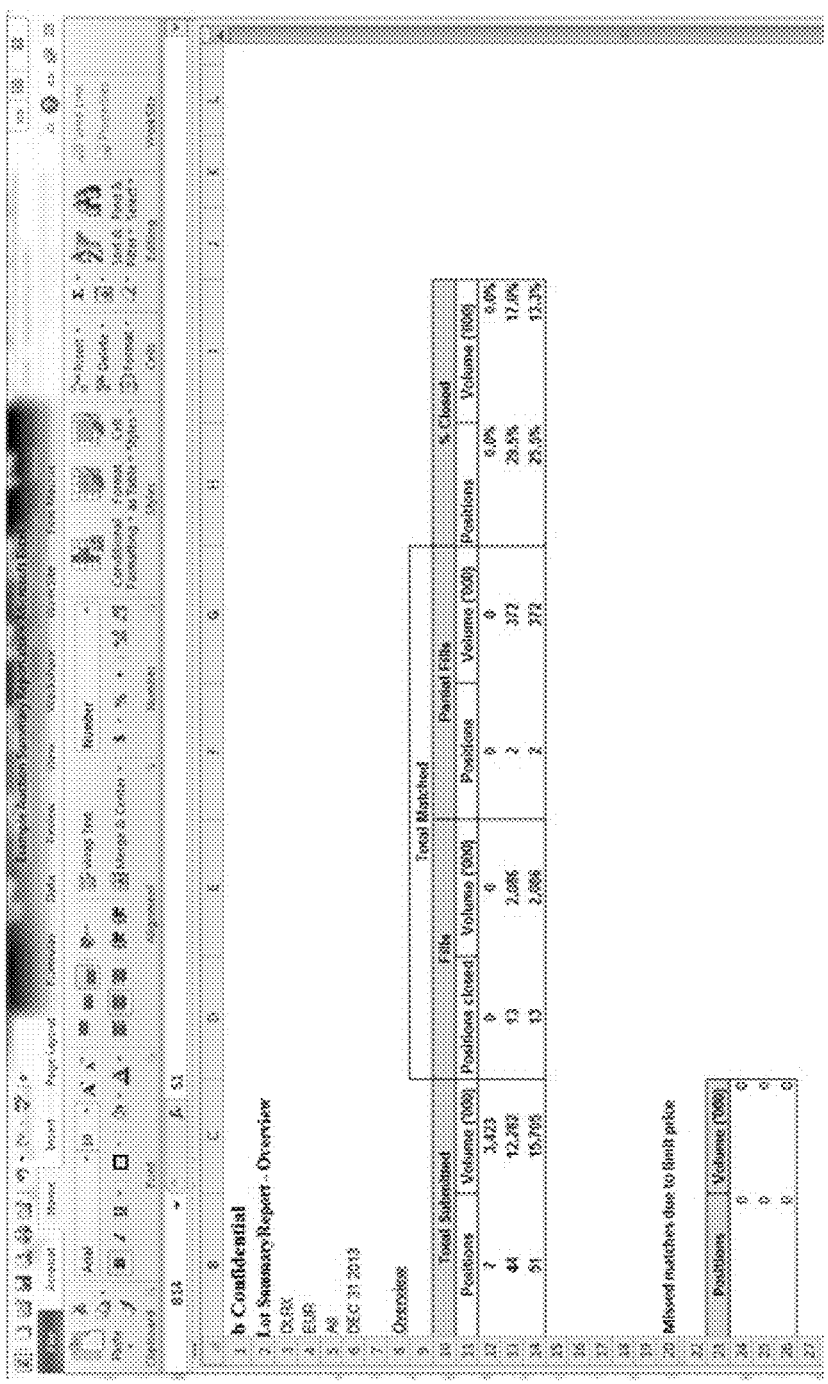
FIG. 5 is an exemplary embodiment of a trade summary report that may be generated by an exemplary embodiment of a trading system and/or method.

In an exemplary embodiment, the trading system 1 may provide dealers with automated summary reports of their transactions. Such reports may contain:
  details of total matched volumes and positions at an aggregated level and by sector;
  a list of all possible matches missed due to limit price; and/or
  a list of all executed trades.
A screen shot of a sample summary report is shown in FIG. 5.

In other exemplary embodiments, other fields for data relating to the order may also be provided in the order entry screen 19, the fills screen 40, and/or the orders and fills screen 50, without limitation. In order to calculate the composite to determine the mid price at which a trade will match, dealers send indicative price levels as bids and offers. When a trade is generated for a participant on the trading system 1 checks may be performed to determine an implied P&L/BestEx value based on a dealer's indicative price. For example, if a dealer makes a buy order in a matching session, the trading system 1 may perform an analysis to compare the dealer's offer price in said bond at the same time as the session is run with the price the dealer is matched at. The difference in these prices is multiplied by quantity to determine an implied value. Data based on this analysis may be relayed to participants at the point of execution or following the session.

In an exemplary embodiment, when a dealer submits a position 31 greater than the minimum tradable size, post session (e.g., after the matching algorithm has run) the dealer will have either completely matched position 31 or be left with a new position greater than minimum tradable size.

The trading system 1 may also receive and/or handle matching and/or data relating to positions 31 that fall below the minimum tradable piece and/or size for a particular bond. In an exemplary embodiment, in the event that one (or both) potential counterparties to an offsetting trade hold: (a) position(s) in less than the minimum tradable piece/size and increment as defined by the term-sheet and prospectus for that security, the trading system 1 will generate two offsetting trades rather than one in order to abide by the minimum tradable size and increment rules for that security.

By way of example, if two potential counterparties each hold a position of nominal 50,000 face value in a bond with a minimum tradable size of nominal 100,000 face value and minimum incremental size of nominal 1,000 face value (one short 50,000: counterparty A, one long 50,000: counterparty B), rather than generate one offsetting trade of 50,000 between the two counterparties the trading system 1 would generate two trades:
  the first would be a purchase of nominal 150,000 by counterparty A from counterparty B
  followed immediately by a sale of nominal 100,000 by counterparty A to counterparty B.
Both these trades would be executed at the same mid price as defined by the trading system. The net value of the trades would still be the same but this succession of trades would address both parties' positions and clear the odd lot.

In alternative embodiments, the trading system 1 may include a positions module capable of analyzing "scrap" positions (e.g., long/short credit positions smaller than nominal 1M) from one or more dealers and providing a price composite for such positions. The trading system 1 may further determine the opposing positions that cross (based on odd lot and/or scrap data received by the trading system) and provide an analysis of such crossed positions (e.g., in tabular, chart, or any other format).

Figure 6:
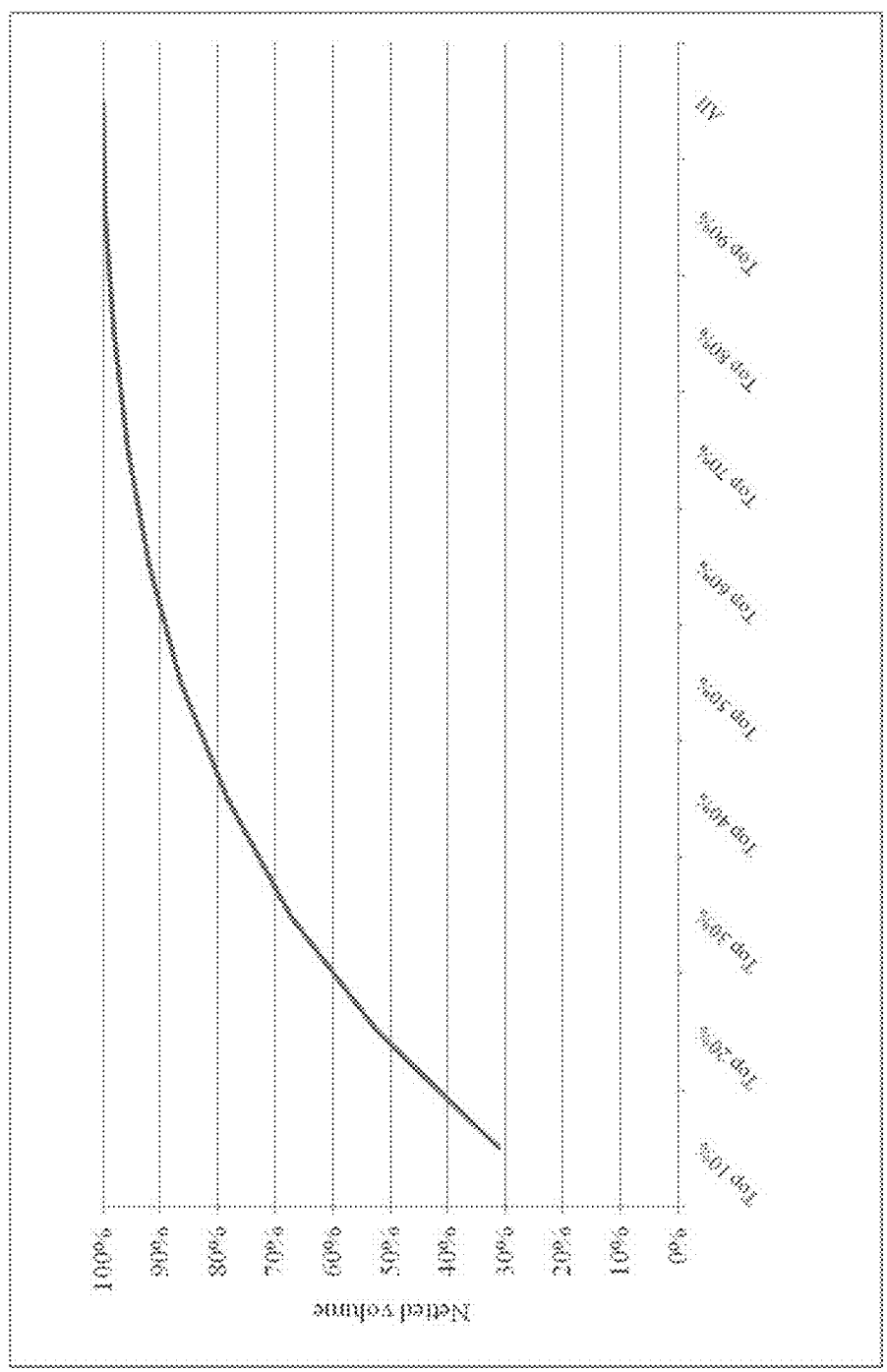
FIG. 6 is a chart of exemplary data reflecting various features of an exemplary embodiment of a trading system and/or method.

For example, the chart shown in FIG. 6 shows an exemplary depiction of the concentration of netted volume across the 1,400 different ISIN's which netted positions. This is based on an analysis of "scraps" positions from 8 dealers. Based on the universe of positions provided: ≈6,000 positions (long & short) totaling >€2.5Bn). Assuming that all opposing positions cross (based on contributed data), the proportion of trades which net out: (1) 29% by # trades; and (2) 29% by volume. The tables in FIG. 7 show the volume which could cross/net based on data provided.

In an exemplary embodiment, crossing sessions may be hosted using the trading system. Dealers may provide positions to the trading system which they wish to net prior to a crossing session. In this regard, the trading system is preferably capable of accepting data relating to, without limitation, a position's ISIN, size, and direction. The trading system may also be programmed to optionally accept data relating to tolerance (which may be a cash price or spread above/below which specific position is not included in crossing exercise), price, and any other trade requirements or limitations. The trading system is capable of determining crossed positions using any combination of the data received from the one or more dealers. In this regard, the trading system may establish mid-market reference points for all bonds that could cross within a session. A price composite may be used when there are multiple dealers providing prices of a particular bond. However, where a price composite in a specific bond is not appropriate, third party reference prices may be used. The trading system may find that positions cross at mid using above price reference as long as the price is within price tolerances provided by the trader when the position was submitted.

In an exemplary embodiment, the trading system is capable of running the following crossing models:
  Prioritizing the closure of small positions;
  Splitting crossable volume equally on an ISIN level; and/or
  Prioritizing the closure of large positions.

In an exemplary embodiment, in systems operation, the crossing session may be run as follows:
  Prior to the crossing session: Dealers can upload their positions to the trading platform. At start of the crossing session those positions with price tolerance are checked against one or more reference prices (which may be a composite produced by the trading system or a third party reference). Those positions outside guidance (based on a predetermined criteria or otherwise) may be excluded. Positions with no contra may also be removed from the crossing session. Market orders may be prioritized over limit orders and the widest submitted prices may be prioritized.
  Session 1: An algorithm runs on the trading system seeking to maximize matches (algorithm may start with short positions).
  Session 2: This session may be run where orders have been excluded due to price tolerance and a contra position still exists. Dealers can be notified with details on potential cross and required price level. The trading system may provide an option to update the position and re-enter into final session. All updated positions may be collated and the algorithm runs again on the remaining positions applying the same methodology.

Completion: The full details of all matches may be provided back to dealers. Details of missed matches due to price tolerance outside market mid may also be provided back to dealers.

In this manner, the trading system 1 can efficiently prioritize the closure of small/large positions.

In an exemplary embodiment, the trading system 1 is preferably capable of maximizing the reduction and/or closure of large positions by performing a position ordering analysis. In one embodiment positions may be ranked for each dealer in percentiles based on size (long/short separately). Any orders with limits (price, risk, and/or otherwise) can be moved to the bottom of the list following the same criteria. Dealers may be ranked on relative basis based on maximum "Crossable Volume. All positions may be aggregated and ranked on first "Percentile_Rank" and then on "Dealer Rank." The dealer with the highest potential crossable volume may be allowed to go first.

Figure 8:
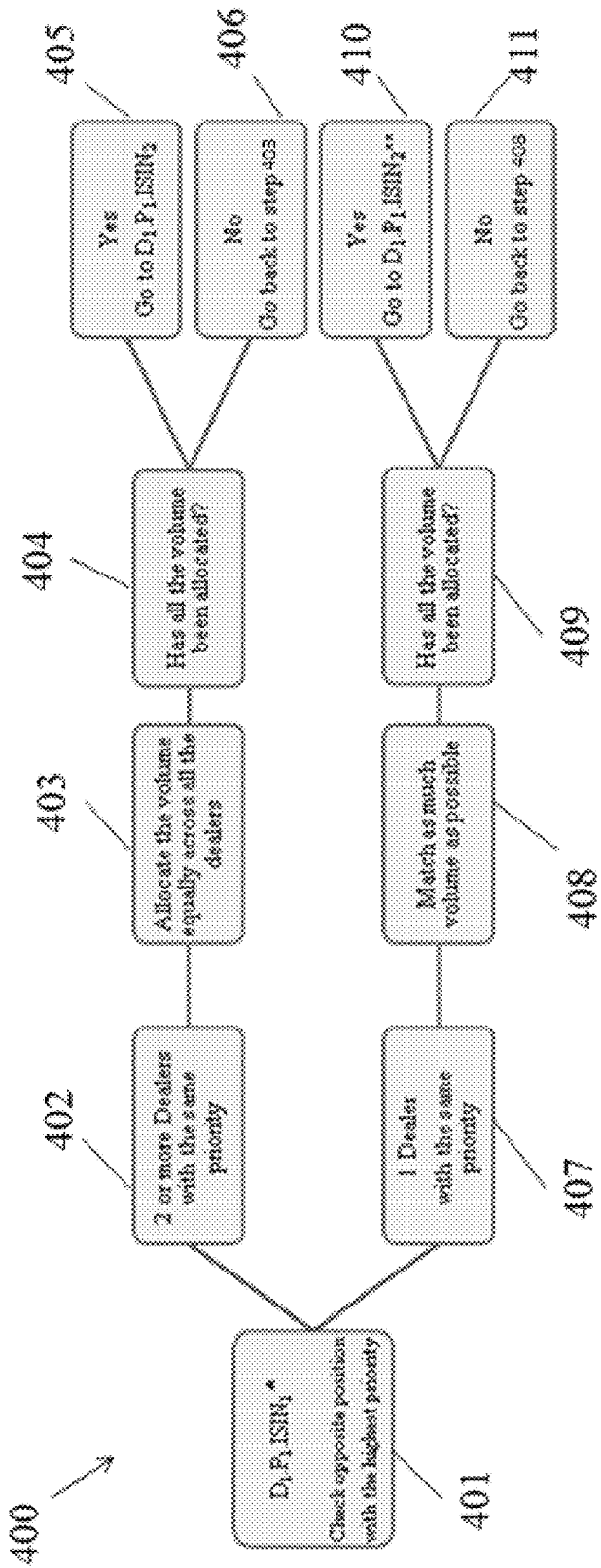
FIG. 8 is an exemplary embodiment of a decision tree reflecting various features of an exemplary embodiment of a trading system and/or method.

For example in an exemplary embodiment, the dealers may have the rankings shown in FIG. 3. In this example, an exemplary embodiment of an algorithm implemented on trading system 1 is preferably capable of performing the following functions:

Match the $1^{st}$ Short ISIN with the highest priority for the $1^{st}$ dealer against the dealer with contra position with the highest priority. If two dealers share same priority on a position, the volume would be split in equal proportions amongst them;

Loop until no further volume can be matched for this Short Position. Stops at the last marker order;

Go to the next case until reaching the last Short position (including limit orders);

An exemplary embodiment of a decision tree 400 for the closure methodologies for prioritizing the closure of Small/Large positions performable by an embodiment of the trading system 1 is shown in FIG. 8. This such embodiment, the trading system calculates a priority for the particular dealer and position using the following methodology (see 401):

$D_1 \cdot P_1 \cdot ISIN_1$=Dealer 1–Priority 1–ISIN 1

The trading system 1 determines whether there is another dealer with the same priority (407) or whether there are 2 or more dealers with the same priority (see 402).

If there is 1 dealer with the same priority, then the trading system 1 matches as much volume as possible (see 408). The trading system 1 determines whether all of the volume has been allocated (see 409). If all the volume has been allocated, then the system moves onto the next ISIN for the dealer until each ISIN for that dealer has been processed (see 410). The next priority is calculated using the following methodology (see 410):

$D_1 \cdot P_1 \cdot ISIN_2$=Dealer 1–Priority 1–ISIN

If not all the volume has been allocated, the trading system 1 goes back to step 408 to match volume.

If there are 2 or more dealers with the same priority (see 402), then the trading system 1 allocates volume equally across all the dealers with the same priority. Then the trading system 1 determines whether all the volume has been allocated (see 404). If all the volume has been allocated, then the trading system 1 moves onto the next ISIN for the dealer until each ISIN for that dealer has been processed (405). The next priority is calculated using the following methodology (see 405):

$D_1 \cdot P_1 \cdot ISIN_2$=Dealer 1–Priority 1–ISIN

If not all the volume has been allocated, then the trading system 1 goes back to step 403 to allocate volume.

In an exemplary embodiment, the trading system 1 is capable of applying an even split methodology to split crossable volume equally on an ISIN level. Preferably, the trading system 1 is capable of analyzing all the positions on an ISIN per ISIN basis in two runs:
1. Excluding limit orders;
2. Including limit orders (prioritized based on price tolerance)

Figure 9:
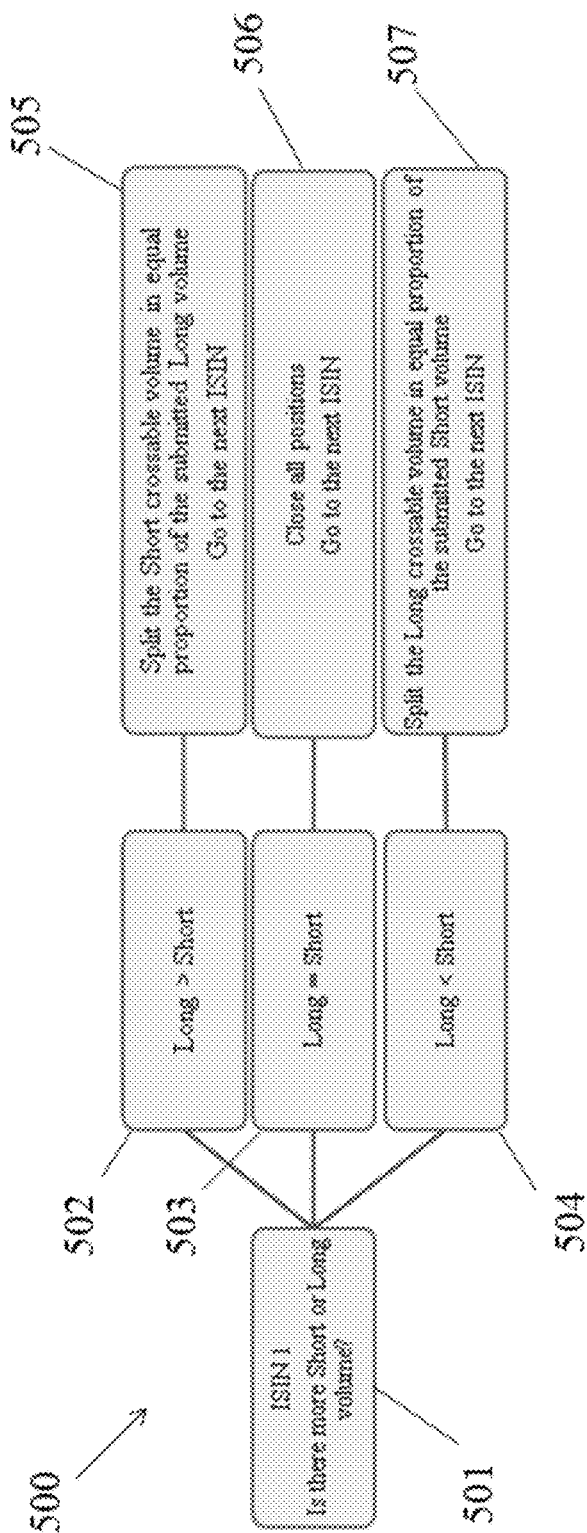
FIG. 9 is an exemplary embodiment of a decision tree reflecting various features of an exemplary embodiment of a trading system and/or method.

An exemplary embodiment of a decision tree 500 used for the even split methodology is shown in FIG. 9. In this embodiment, the trading system 1 assesses whether a particular ISIN has more long or short volume (see 501). If the amount of long volume is greater than the amount of short volume (see 502), then the trading system 1 splits the short crossable volume in equal proportion of the submitted long volume and then goes to the next ISIN to perform the same analysis (see 505). If the amount of long volume equals the amount of short volume (see 503), then the trading system 1 closes all positions and goes to the next ISIN to perform the same analysis (see 506). If the amount of long volume is less than the amount of short volume (see 504), then the trading system 1 splits the long crossable volume in equal proportion of the submitted short volume and goes to the next ISIN to perform the same analysis (see 507).

This decision tree is applied in the example illustrated in FIG. 10. In the scenario shown in FIG. 10, because the long volume is greater than the short, the short crossable volume is split in equal proportion to the submitted long volume. The table shows that there are 250 long positions and 50 short positions. Hence, 250>50 and the top block in the above decision tree applies. The 50 short positions of D1 are closed out proportionally between D2 and D3. D2, who has 100 long positions, can purchase 20 of the short positions and D3 who has 150 long positions can purchase the other 30 short positions.

It should be noted that references herein to phrases such as "one embodiment" or "an embodiment" means that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

While there have been shown and described fundamental novel features of the invention as applied to the exemplary embodiments thereof, it will be understood that omissions and substitutions and changes in the form and details of the disclosed invention may be made by those skilled in the art without departing from the broad inventive concept thereof. It is understood, therefore, that this invention is not limited to the particular embodiments disclosed, but it is intended to cover modifications within the spirit and scope of the present invention as defined by the appended claims. While there had been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art. It is the intention, therefore, to be limited only as indicated by the scope of the claims appended hereto. It is also to be understood that the following claims are intended to cover all of the generic and specific features of the invention herein disclosed and all statements of the scope of the invention that, is a matter of language, might be said to fall therebetween.

The invention claimed is:

1. An odd-lot clear up system configured to match one or more first trading positions of a first dealer with one or more second trading positions of a second dealer, the one or more first trading positions and the one or more second trading positions collectively comprising at least one odd lot position, the system comprising:
   an order entry module including one or more computer systems operative to accept the one or more first trading positions and the one or more second trading positions;
   a matching module including one or more back-end computer systems operative to anonymously match one of the first trading positions with one of the second trading positions based on one or more predetermined matching criteria including prioritizing the closure of odd lot positions;
   a graphical user interface that permits the first dealer and second dealer to submit and monitor the one or more first trading positions and the one or more second trading positions;
   wherein the system is configured with programming to execute a trade when a match is formed.

2. The system of claim 1 wherein:
the matching module is further operative to form matches with one or more positions that are less than a predetermined minimum tradeable size, by generating offsetting trades.

3. The system of claim 1 wherein:
the system further comprises a prioritizing module operative to assign a rank to each of the first dealer and second dealer; and
the one or more predetermined matching criteria additionally includes the ranks of the first dealer and the second dealer.

4. The system of claim 1 wherein:
the system further comprises a prioritizing module operative to assign a percentile to each of the first dealer and second dealer; and
the one or more matching criteria additionally includes the percentiles of the first dealer and the second dealer.

5. The system of claim 1 wherein:
the one or more first trading positions each include a unique identifying code for a financial instrument and a quantity of such financial instrument to be traded; and
the one or more second trading positions each include a unique identifying code for a financial instrument and a quantity of such financial instrument to be traded.

6. The system of claim 1 further comprising a fills module including one or more computer systems operative to indicate whether any of the one or more first trading positions or the one or more second trading positions have been filled.

7. The system of claim 1 further comprising an orders and fills module including one or more computer systems operative to display data concerning the one or more first trading positions and the one or more second trading positions.

8. The system of claim 1 wherein the graphical user interface includes a timer capable of tracking the amount of time remaining for the first dealer and the second dealer to submit trading positions.

9. A method for clearing odd lot positions by matching one or more first trading positions of a first dealer with one or more second trading positions of a second dealer, the one or more first trading positions and the one or more second trading positions collectively comprising at least one odd lot position, the method comprising:
   accepting the one or more first trading positions from the first dealer;
   accepting the one or more second trading positions from the second dealer;
   anonymously forming matches between one of the first trading positions and an opposing one of the second trading positions based on one or more predetermined matching criteria, including prioritizing the closure of odd lot positions; and
   forwarding trades for execution based on the matches.

10. The method of claim 9 additionally comprising matching one or more positions that are less than a predetermined minimum tradeable size by generating offsetting trades.

11. The method of claim 9 further comprising:
assigning dealer priorities to each of the first dealer and the second dealer; and
wherein the one or more predetermined matching criteria additionally includes the dealer priorities.

12. The method of claim 11 wherein the dealer priorities are assigned based on at least one of: a dealer percentile; a dealer rank; a dealer volume; and a dealer time entry.

13. The method of claim 9 further comprising:
assigning position priorities to each of the first trading positions and the second trading positions; and
wherein the one or more predetermined matching criteria additionally includes the position priorities.

14. The method of claim 9 further comprising:
receiving trade limits from one of the first dealer and the second dealer;
determining whether any matches violate the trade limits; and
cancelling the trade if any match violates a trade limit.

* * * * *